United States Patent [19]

Gründken et al.

[11] Patent Number: 4,658,952
[45] Date of Patent: Apr. 21, 1987

[54] SCRAPER-CHAIN CONVEYOR CHANNEL SECTION

[75] Inventors: Dieter Gründken; Manfred Redder, both of Lünen; Franz Roling, Nordkirchen; Michael Sauer, Werne-Stockum; Gunther-Dietmar Schoop, Ottmarsbocholt, all of Fed. Rep. of Germany

[73] Assignee: Gewerkschaft Eisenhutte Westfalia, Lunen, Fed. Rep. of Germany

[21] Appl. No.: 626,455

[22] Filed: Jun. 29, 1984

[30] Foreign Application Priority Data

Jul. 5, 1983 [DE] Fed. Rep. of Germany ....... 3324108

[51] Int. Cl.$^4$ ............................................. B65G 19/28
[52] U.S. Cl. .................................. 198/735; 198/860.3
[58] Field of Search ................ 198/735, 860.2, 861.1, 198/860.3

[56] References Cited

U.S. PATENT DOCUMENTS

| | | | |
|---|---|---|---|
| 2,818,164 | 12/1957 | Dommann | 198/735 |
| 4,074,804 | 2/1978 | Grundken et al. | 198/735 |
| 4,282,968 | 8/1981 | Temme | 198/735 |
| 4,359,154 | 11/1982 | Temme | 198/735 |
| 4,373,757 | 2/1983 | Gehle | 198/735 X |

FOREIGN PATENT DOCUMENTS

| | | | |
|---|---|---|---|
| 1250345 | 9/1967 | Fed. Rep. of Germany | 198/735 |
| 2401835 | 7/1975 | Fed. Rep. of Germany | 198/735 |
| 2427240 | 12/1975 | Fed. Rep. of Germany | 198/735 |
| 3126446 | 1/1983 | Fed. Rep. of Germany | 198/735 |
| 467710 | 6/1937 | United Kingdom | 198/735 |
| 902578 | 8/1962 | United Kingdom | 198/735 |
| 1132567 | 11/1968 | United Kingdom | 198/735 |
| 1226651 | 3/1971 | United Kingdom | 198/735 |
| 2069961 | 9/1981 | United Kingdom | 198/735 |
| 2095195 | 9/1982 | United Kingdom | 198/735 |

Primary Examiner—Joseph E. Valenza
Attorney, Agent, or Firm—Maurice E. Gauthier

[57] ABSTRACT

A scraper-chain conveyor channel section comprises a pair of side walls and a floor plate extending between the side walls and connecting the side walls together. Each of the side walls has upper, lower and intermediate inwardly-extending flanges. The floor plate is connected to the intermediate flanges of the two side walls. Each of the side walls is constituted by an upper profiled bar and a lower profiled bar, each of the profiled bars being a generally U-shaped rolled section. Each of the lower profiled bars has a bottom flange and a top flange parallel to the bottom flange. The top flange of each lower profiled bar forms a support surface for the associated upper profiled bar, and constitutes part of the intermediate flange of the associated side wall. Each of the side walls is provided with a connecting bar for laterally supporting the associated upper profiled bar. Each of the connecting bars is secured to the exterior of the associated lower profiled bar, and projects upwardly beyond the top flange of that lower profiled bar.

19 Claims, 12 Drawing Figures

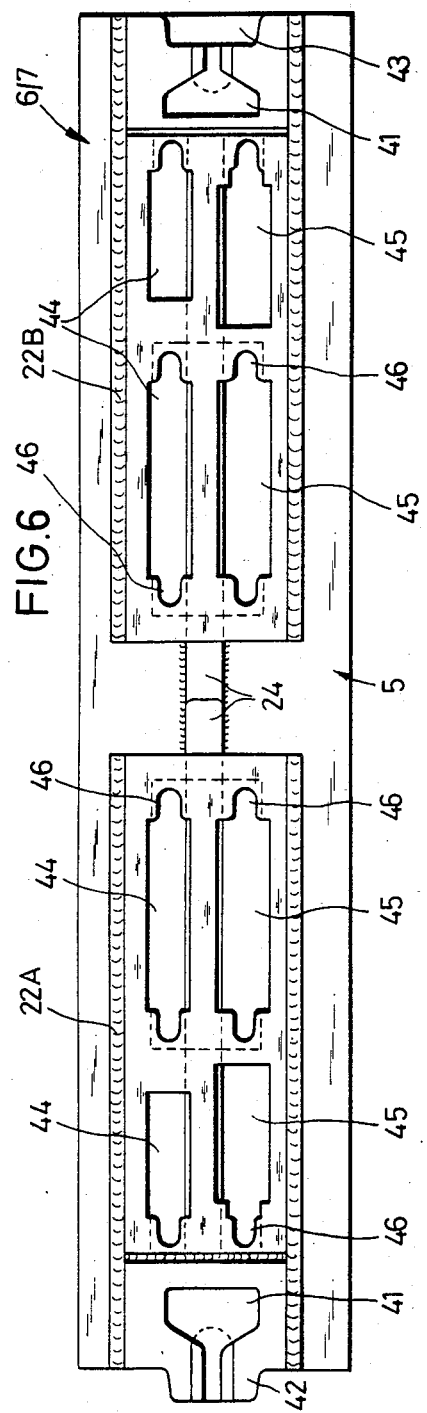
FIG.6
FIG.7
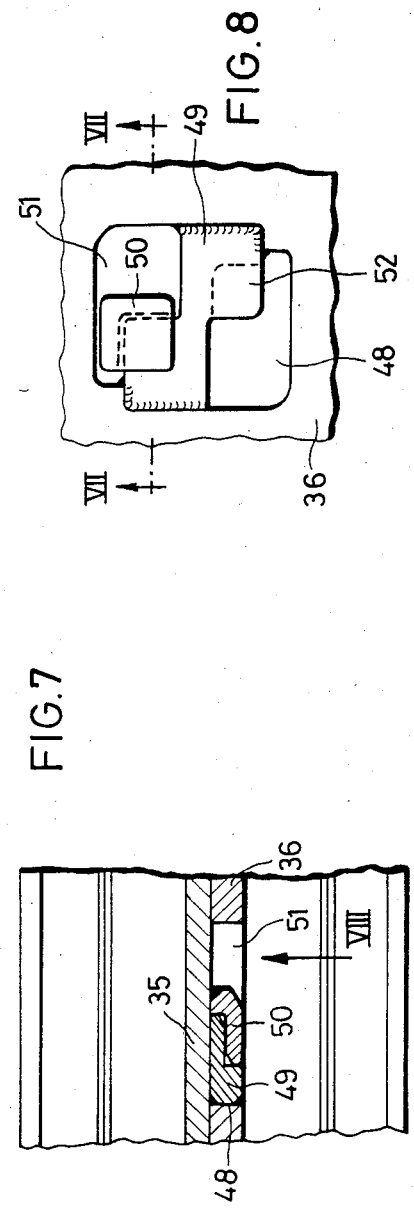
FIG.8

SCRAPER-CHAIN CONVEYOR CHANNEL SECTION

BACKGROUND TO THE INVENTION

This invention relates to a channel section for a scraper-chain conveyor.

Known scraper-chain conveyors, which are used primarily in underground mine workings, are constituted by a series of channel sections (or pans), which are connected together in an end-to-end relationship. The channel sections are joined together in such a manner as to resist tensile forces which tend to draw the ends of the channel sections apart; whilst permitting some angular mobility, in all directions, between the channel section ends.

The channel sections of one known type of scraper-chain conveyor have sigma-section side walls and a floor plate welded to the central portions of the side walls. Each of the side walls has inwardly-extending flanges at the top, the centre, and the base, the central flange being connected to the top and base flanges by means of a V-shaped wall sections and by respective short vertical wall sections. The V-shaped wall sections define V-shaped grooves in the external surfaces of the side walls. The floor plate is welded to the central flanges of the sigma-shaped side walls. A scraper assembly circulates along the row of channel sections in upper and lower runs formed respectively above and below the floor plates. The ends of the scrapers are guided by the adjacent portions of the side walls of the channel sections.

A scraper-chain conveyor usually has a centre chain scraper assembly or an outboard chain scraper assembly. In a centre chain scraper assembly, the scrapers are attached to one (or, more usually, two) endless scraper chain which run along the centre of the conveyor; whereas, in a double outboard chain scraper assembly, the ends of the scrapers are connected to two outboard scraper chains, which run in profiled guides associated with the side walls of the conveyor sections.

The side walls of the conveyor channel sections are usually constituted by one-piece rolled sections of generally sigma-shaped profile. Side walls of different shapes and dimensions have to be provided for use with centre chain scraper assemblies and outboard chain scraper assemblies. Moreover, side walls of different dimensions and strengths have to be used to cater for different conveyor capacities, and for different operating conditions. Thus, for the various types of scraper-chain conveyor, a large number of side walls of different shape and/or size (and consisting of costly rolled sections) are required.

It is also known to make the side walls of conveyor channel sections of multi-part construction. For example, one known type of side wall has a lower profiled bar, acting as a lower run chain guide, and an upper profiled bar serving to guide the scrapers in the upper run. Such channel sections are made of sheet-metal sections, which are not capable of resisting the heavy loads that occur when conveyors are used in underground mining operations (see DE-AS 10 73 386, DE-PS 970, 381, DE-PS 848 177, DE-PS 902 236, DE-AS 11 09 087 and DE-PS 940 636).

In this connection it is also known to make channel section side walls of three bolted-together sectional members. In this case, the upper and lower members form the upper and lower flanges of the side walls, while the intermediate members carry the floor plates of the conveyor. (See DE-OS 29 06 097 and DE-OS 10 51 727). Finally, it is also known to divide the conventional sigman-shaped side walls, and to weld the lower profiled bars, which serve to guide the scrapers in the lower run, to a slide carrying the conveyor. In this case, the upper profiled bars, together with the base of the conveyor, form a conveyor trough which is suspended on the side walls of the slide by means of straps and hinge bolts (see DE-AS 22 10 897).

The aim of the invention is to provide a conveyor channel section which has great stability and uses comparatively simple, low-cost standard rolled sections; which can be produced at a lower cost than known channel sections having sigma-shaped side walls consisting of one-piece rolled sections; and which, while using standard rolled sections, can be used to adapt the side walls to suit different types of mine conveyor, so that it is possible to avoid the use of the large number of rolled sections of differing forms and/or dimensions for producing the different channel sections.

SUMMARY OF THE INVENTION

The present invention provides a scraper-chain conveyor channel section comprising a pair of side walls and a floor plate extending between the side walls and connecting the side walls together, each of the side walls having upper, lower and intermediate inwardly-extending flanges, the floor plate being connected to the intermediate flanges of the two side walls, wherein each of the side walls is constituted by an upper profiled bar and a lower profiled bar, each of the profiled bars being a generally U-shaped rolled section, each of the lower profiled bars having a bottom flange and a top flange parallel to the bottom flange, the top flange of each lower profiled bar forming a support surface for the associated upper profiled bar and constituting part of the intermediate flange of the associated side wall, wherein each of the side walls is provided with a connecting bar for laterally supporting the associated upper profiled bar, each of the connecting bars being secured to the exterior of the associated lower profiled bar and projecting upwardly beyond the top flange of that lower profiled bar.

Each side wall of this channel section is, therefore, constituted by two profiled bars, each being a relatively small rolled U-section, the profiled bars together corresponding to the previously-used relatively large, one-piece, rolled sigma-sections. The upper profiled bar of each side wall is supported on the top flange of the associated lower profiled bar, and can be braced laterally against the upwardly-projecting connecting bar which is permanently connected to the lower profiled bar, preferably by welding. The welding work for producing channel sections from rolled profiled bars, and for attaching the connecting bar, does not need to be greater than the work hitherto involved in forming channel sections from one-piece side walls. For the lower profiled bars, use can be made of rolled sectios of increased cross-sectional dimensions, and lighter or heavier upper profiled bars can be connected thereto as desired. The lower profiled bars can, therefore, form standard sections for producing channel sections of differing stability, so that channel sections for various types of conveyor can easily be produced.

Advantageously, each of the connecting bars is a spill plate holder. Conveniently, the top flange of each lower profiled bar is of the same length as the bottom flange of that lower profiled bar.

In a preferred embodiment, each lower profiled bar has a substantially trapezoidal inner contour which is shaped and sized to guide the scrapers of an outboard chain scraper assembly or the scrapers of a centre chain scraper assembly. In this arrangement, therefore, the lower profiled bars are standard rolled sections, the inner contour of which is suited to all the usual types of scraper assembly, being so formed that the scrapers of both centre chains scraper assemblies and of double outboard chain scraper assemblies can be accommodated. This means that the lower profiled bars can be used for both centre chain conveyors and double outboard chain conveyors. The upper profiled bars can then be, as required, either similar profiled bars to the lower profiled bars (for double outboard chain conveyors), or smaller profiled bars (for centre chain conveyors).

In order that the lower profiled bars are suitable for guiding the two types of scraper assembly, the flanges of the lower profiled bars are increased in length by about 20 to 25% of the total length of the comparable flanges of the side walls normally used in the case of centre chain conveyors, this increase in length being such that reliable guiding of outboard scraper assemblies is also achieved. Conveniently, this is accomplished if the bottom flange of each lower profiled bar has an inner surface constituted by first and second planar faces, the first planar face being situated adjacent to the free end of the bototm flange, and the second planar face being situated adjacent to a vertical web portion forming the base of that U-shaped lower profiled bar, and wherein the first planar face of each bottom flange is inclined to the horizontal at a smaller angle than the associated second planar face. Advantageously, each first planar face is inclined at an angle of substantially 9° to the horizontal, and each second planar face is inclined at an angle of substantially 19° to the horizontal. The flange portion extending from the junction of said first and second planar surfaces to the free end of the flange corresponds to the above-mentioned increase in length of the flange as compared with the comparable flange of known centre chain conveyors.

Conveniently, each upper profiled bar has a top flange and a bottom flange, said top flange constituting the upper flange of the associated side wall, and said bottom flange forming part of the intermediate flange of the associated side wall. Advantageously, the top flange of each upper profiled bar has an inner surface constituted by first and second planar faces, said first planar face being situated adjacent to the free end of the top flange, and said second planar face being situated adjacent to a vertical web portion forming the base of that U-shaped upper profiled bar. Preferably, the first planar face of the top flange of each upper profiled bar is substantially horizontal, and the associated second planar face is inclined at an angle of substantially 35° to the horizontal.

As mentioned above, it is possible for the upper profiled bar of each side wall to be of similar cross-sectional shape and size to the lower profiled bar of that side wall, so that the channel section can be used in a double outboard chain conveyor. On the other hand, however, the upper profiled bars may differ in shape and dimensions from the lower profiled bars if the channel section is to be used in a centre chain conveyor. In this case, the top flange of each upper profiled bar is shorter than its bottom flange, and the upper profiled bar of each side wall is of smaller cross-sectional shape and size than the lower profiled bar of that side wall, each upper profiled bar having a substantially trapezoidal inner contour which is shaped and sized to guide the scrapers of a centre chain scraper assembly. Advantageously, the vertical dimension of the upper profiled bar of each side wall is less than that of the lower profiled bar of that side wall.

Each connecting bar acts as a lateral brace for the associated upper profiled bar and, expediently, also as means for connecting it to the associated lower profiled bar. It constitutes a reinforcing bar, and is preferably so formed that the usual attachments can be bolted on to it. In a preferred embodiment, each connecting bar is provided with at least two vertically-spaced rows of recesses, the recesses of each row being distributed along the length of the associated connecting bar, and constituting attachment points for receiving bolts. Each connecting bar may extend over substantially the entire length of the channel section, and be welded to the associated lower profiled bar. Each connecting bar may also be provided with coupling elements for connecting the channel section to adjacent channel sections, that is to say it may have pockets for a toggle bolt.

In a preferred embodiment, each connecting bar is constituted by at least two portions which are welded to one another at their adjacent ends. One connecting bar may, alternatively, form means for guiding a winning machine, in particular a plough, or it can form a mounting bar which is a component of such guide means.

Particularly when designed to act as a spill plate holder, each connecting bar is advantageously of such width that it terminates at a distance below the top flange of the associated upper profiled bar. Preferably, each connecting bar extends from about the middle of the associated lower profiled bar to about the middle of the associated upper profiled bar.

Advantageously, the upper and lower profiled bars of each side wall define a generally sigma-shaped configuration having a V-shaped recess extending longitudinally along the exterior surface of that side wall. Preferably, each connecting bar is provided with a continuous longitudinal rib, or with at least one longitudinal rib, formed integrally therewith, the or each rib of each connecting bar being engageable in the V-shaped recess of the associated side wall and being welded to the associated lower profiled bar in said recess at the level of the top flange of said lower profiled bar.

The channel section of the invention can incorporate different forms of conveyor floor plate to suit the particular condictions in which the conveyor is to be used. For example, in a preferred embodiment, the floor plate has a thickness which is substantially equal to the sum of the thicknesses of the top flange of each of the lower profiled bars and the bottom flange of each of the upper profiled bars, and wherein the floor plate is welded to each of said top flanges and each of said bottom flanges. Alternatively, the floor plate is constituted by a top plate and a bottom plate, the top plate extending between the bottom flanges of the upper profiled bars, and the bottom plate being welded to the top flanges of the lower profiled bars. The two plates are in face-to-face engagement. The top plate may be welded to the bottom flanges of the upper profiled bars. Preferably, however, the top plate is a replaceable wear plate detachably connected to the bottom flange of the upper profiled bar. In the latter case, the lower surface of the top plate is provided with stop elements which engage in recesses in respective shaped elements which are secured in apertures formed in the bottom plate. Preferably, each of the stop elements is a claw-shaped member; and each of the shaped elements is Z-shaped and has a claw-receiving recesses which open in opposite directions, so that the bottom plate can be reversed to suit the particular conveying direction.

Each of the connecting bars may be welded to the associated upper profiled bar. Alternatively, the conveyor tray formed by the upper profiled bars and the bottom plate may be releasably connected to the return tray formed by the lower profiled bars and the bottom plate.

The invention also provides a scraper-chain conveyor channel section comprising a pair of side walls and a floor plate extending between the side walls and connecting the side walls together, wherein each of the side walls is constituted by an upper profiled bar and a lower profiled bar, each of the profiled bars being a generally U-shaped rolled section, the upper profiled bar of each side wall being supported by the lower profiled bar of that side wall, and wherein each lower profiled bar has a substantially trapezoidal inner contour shaped and sized to guide the scrapers of an outboard chain scraper assembly or the scrapers of a centre chain scraper assembly.

BRIEF DESCRIPTION OF THE DRAWINGS

The invention will now be described in greater detail, by way of example, with reference to the accompanying drawings, in which:

FIG. 6 is a side elevation, on a larger scale, of the channel section shown in FIG. 5;

FIG. 7 is a vertical cross-section taken through the floor plate of the channel section shown in FIGS. 5 and 6, and shows means for fixing together the two plates forming the floor plates of the channel sections;

FIG. 8 is a view in the direction indicated by the arrow VIII shown in FIG. 7;

DESCRIPTION OF PREFERRED EMBODIMENTS

Figure 5:
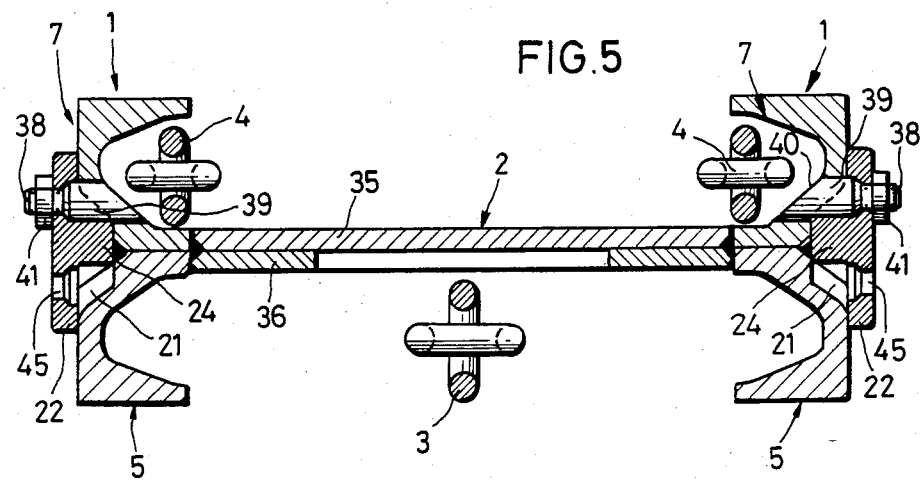
FIG. 5 is a transverse cross-section through a conveyor channel section including side walls of the type shown in FIG. 1B.

Reffering to the drawings, FIG. 5 shows a scraper-chain conveyor channel section having a pair of side walls 1, each of which has a generally sigma-shaped profile. The side walls 1 are arranged in a mirror-symmetrical manner, and each has an upper flange, a lower flange and an intermediate flange. A conveyor floor plate 2 is arranged between, and connected to, the intermediate flanges. The floor plate 2 forms part of the conveyor floor along which mineral material (such as coal) is conveyed by the scraper assembly of the conveyor. In the case of a centre chain conveyor, the channel section can be used with a scraper assembly having one or two scraper chains travelling in the central zone of the conveyor. Alternatively, in the case of a double outboard chain conveyor, the channel section can be used with a scraper assembly (not shown) having scrapers attached to round-link chains running in the zones of the side walls 1. In FIG. 5, a single centre chain is shown, at 3, in the lower run, whereas two outboard chains 4 are shown in the upper run.

Figure 1:
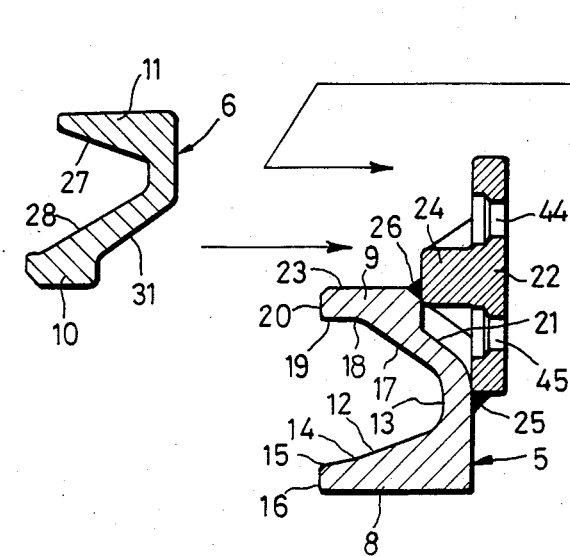
FIG. 1 shows, in section, a lower profiled bar together with two alternative upper profiled bars which, if required, can be combined with the lower profiled bar to form a conveyor channel section side wall constructed in accordance with the invention.
Figure 1:
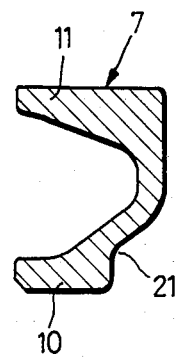

FIG. 1 shows one of the side walls 1 in detail. This side wall 1 is constituted by a lower profiled bar 5 and an upper profiled bar 6 or 7. The profiled bars 5, 6 and 7 each consists of a substantially U-shaped rolled section. The lower profiled bar 5 has two parallel flanges 8 and 9 of equal length. The upper profiled bars 6 and 7 each have bottom and top flanges 10 and 11 respectively. The bottom flange 8 of the lower profiled bar 5 forms the lower flange of the side wall 1; whereas the top flange 9 of the lower profiled bar, together with the bottom flange 10 of either of the upper profiled bars 6 and 7 constitutes the intermediate flange of the side wall. The top flange 11 of the upper profiled bar 6 or 7 forms the upper flange of the side wall 1.

The lower profiled bar 5 is a standard rolled section, with which can be combined optionally with an identical upper profiled bar 7, or with a differing upper profiled bar 6. The lower profiled bar 5 is so designed that its inner contour is suitable either for guiding the scrapers connected to the outboard chains 4 (see FIG. 5), or for guiding the scrapers attached to at least one centre chain 3. The inner contour of the profiled bar 5 is substantially trapezoidal, being formed at the lower side by the inner contour of the bottom flange 8, and at the upper side by the inner contour of the top flange 9. The inner surface of the bottom flange 8 has a flat portion 12 which is inclined to the horizontal at an angle of at least approximately 19°. This flat portion 12 extends away from the inner surface 13 of the vertical web of the lower profiled bar 5 to a bent-away zone 14. The bottom flange 8 also has a portion 15 which extends from the bent-away zone 14 toward the free end 16 of the flange, the portion 15 being inclined to the horizontal at an angle of at least approximately 9°. The portion 15 constitutes a flange extension which is provided for ensuring efficient guiding of the outboard chains 4 (see FIG. 5).

The inner surface of the top flange 9 has a flat portion 17 which is upwardly inclined relative to the horizontal at an angle of at least approximately 35°. This flat portion 17 extends away from the inner surface 13 of the vertical web of the lower profiled bar 5 to a bent-away zone 18 that lies vertically above the bent-away zone 14. The top flange 9 also has a portion 19 which extends from the bent-away zone 18 towards the free end 20 of the top flange 9, the portion 19 being substantially horizontal.

The angles referred to above are selected to cater for the heaviest outboard chains 4 likely to run in the channel section. It will be understood that the angles of inclination of the portions 12, 15, 17 and 19 can differ to suit the particular round-link chain that is used. Of particular importance is the fact that the flanges 8 and 9 are 20 to 25% longer than the corresponding flanges of the side walls of a centre chain conveyor. This ensures efficient guiding of the outboard chains 4, and that, at these lengthened portions, the slope of the portions 15 and 19 is considerably less than at the portions 12 and 17 which converge towards the web 13.

The lower profiled bar 5 defines a recess 21, formed by rolling, in the zone of transition between the web 13 and the top flange 9. A connecting bar 22 is fixed to the outer side of the web 13 of the U-shaped lower profiled bar 5, the connecting bar taking the form of a spill plate holder. The connecting bar 22, which is a drop-forging, projects upwardly beyond the horizontal top surface 23 of the top flange 9, and has ribs 24 which engage within the recess 21. The connecting bar 22 serves as a reinforcement member, and is firmly connected, by welding, to the lower profiled bar 5 at regions 25 and 26.

The upper profiled bar 6 can be used only for guiding the scrapers of a centre chain scraper assembly. Its top flange 11 does not extend inwardly to the same extent as its bottom flange 10. The inner contour of the upper profiled bar 6, which serves to guide the scrapers of a centre chain scraper assembly, is formed by two flat faces 27 and 28 which converge towards the vertical web of the bar, and do not include bent-away zones. The faces 27 and 28 are inclined to the horizontal at angles of 19° and 30° respectively. The extent to which the bottom flange 10 projects beyond the top flange 11 towards the middle of the channel section is substantially equal to the extension of the flanges 8 and 9 of the lower profiled bar 5, that is to say, to the distance of the bent-away zones 14 and 18 from the free ends 16 and 20 of the associated flanges 8 and 9.

Figure 1A:
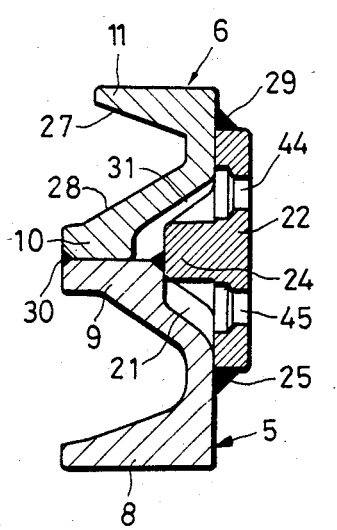
FIG. 1A and FIG. 1B each show, in section, a side wall constructed using the lower profiled bar shown in FIG. 1 and one of the two upper profiled bars shown in FIG. 1.

FIG. 1A shows the two profiled bars 5 and 6 in the connected position. The web of the upper profiled bar 6 is welded, at 29, to the connecting bar 22; and its bottom flange 10 (which is braced against the top flange 9 of the lower profiled bar 5) is welded, at 30, to the top flange 9 of the lower profiled bar. The upper profiled bar 6 defines a recess 31, formed by rolling the zone of transition between its vertical web and its bottom flange 10. This recess 31, together with the recess 21, constitutes a V-shaped groove in the outer surface of the side wall 1, this groove extending over the entire length of the side wall, and being covered by the connecting bar 22. The connecting bar 22 terminates below the top flange 11 of the upper profiled bar 6, and extends from about the middle of the lower profiled bar 5 to about the level of the transition zone between the vertical web and the top flange 11 of the upper profiled bar 6.

Figure 1B:
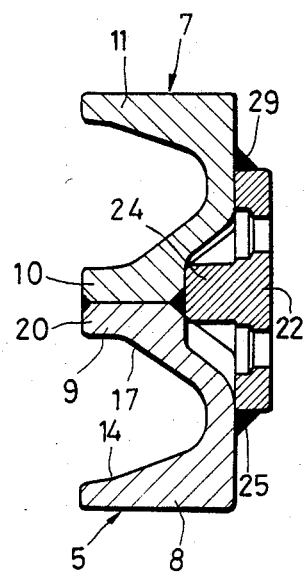

FIG. 1B shows the two profiled bars 5 and 7 (which are identical) in the connected position. Here again, the bottom flange 10 of the upper profiled bar 7 is braced against the top flange 9 of the lower profiled bar 5. Since the upper profiled bar 7 has a greater vertical dimension than the profiled bar 6, the weld seam 29 is located approximately at the level of the middle of the upper profiled bar 7. The side wall 1 shown in FIG. 1B is intended for use in making channel sections for use with double outboard chain scraper assemblies. As shown in FIGS. 1a and 1B, the outer surfaces of the vertical web of the upper profiled bars 6 and 7 bear laterally against the connecting bar 22.

Figures 2, 3, 4:
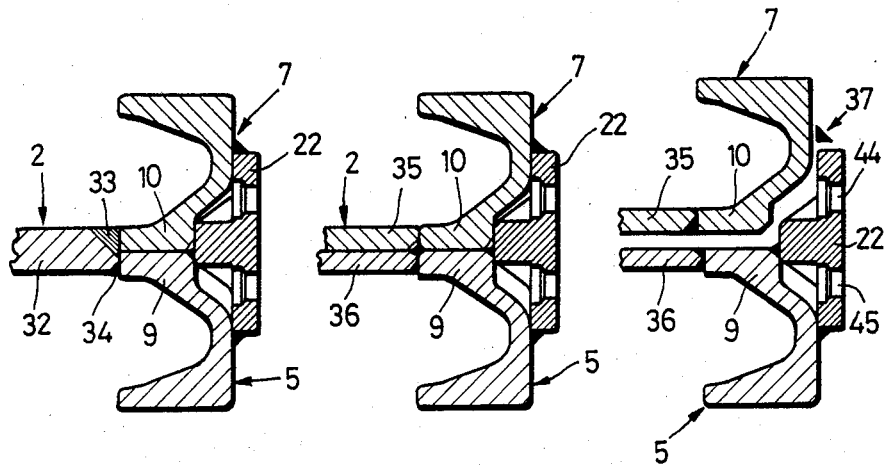
FIGS. 2 to 4 each show, in section, a different floor plate/side wall combination, the side wall being as shown in FIG. 1B.

FIGS. 2 to 4 each show a different floor plate/side wall combination, the side walls being as shown in Fig. 1B. It will understood that the different forms of floor plate could also be used with the side wall 1 of FIG. 1A, in the use of a centre chain conveyor. In FIG. 2, the floor plate 2 is constituted by a high-strength plate 32, the thickness of which is approximately equal to the sum of the thicknesses of the flanges 9 and 10 of the profiled bars 5 and 7. The plate 32 is welded, at 33 and 34 respectively, to the two flanges 9 and 10. It will be understood that the other side wall (not shown) of the channel section is correspondingly shaped, and is welded to the plate 32. The two flanges 9 and 10 together form the intermediate flange of the generally sigma-shaped side wall 1.

In the embodiment shown in FIG. 3, the floor plate is constituted by two plates 35 and 36 disposed on above the other with no space therebetween. The lower plate 36 is welded to the top flanges 9 of the two lower profiled bars 5 (only one of which can be seen in FIG. 3) of the channel section. Its thickness corresponds roughly to that of the top flanges 9. The upper plate 35, which has a thickness roughly equal to that of the bottom flanges 10 of the upper profiled bars 7 (only one of which can be seen in FIG. 3), is welded to the two bottom flanges 10 of the upper profiled bars. Alternatively, the upper plate 35 may be a wear plate which is detachably arranged between the flanges 10 for each replacement.

In the embodiment shown in FIG. 4, the floor plate is again constituted by two vertically superposed plates 35 and 36. Here again, the plate 35 is welded to the bottom flanges 10 of the two upper profiled bars 7 (only one of which can be seen in FIG. 4), and the plate 36 is welded to the top flanges 9 of the two lower profiled bars 5 (only one of which can be seen in FIG. 4). The lower plate 36 is, however, separate from the upper plate 35 so that the conveyor tray formed by the two upper profiled bars 7 and the welded-in plate 35 is permanently connected to the return tray formed by the two lower profiled bars 5 and the welded-in plate 36 only by means of welds 37, which connect the upper profiled bars 7 to the two spill plate holders 22 (only one of which can be seen in FIG. 4). Consequently, the conveyor tray can be lifted away from the return tray, and replaced, following breaking of the welds 37.

FIG. 5 shows a channel section having a conveyor tray, which is releasably connected to the return tray, and so can be replaced. The conveyor tray (constituted by the upper profiled bars 7 and the welded-in bottom plate 35) rests on the return tray (constituted by the lower profiled bars 5 and the welded-in plate 36), and is detachably connected thereto by means of horizontal bolts 38. The bolts 38 pass through aligned holes in the webs of the upper profiled bars 7 and in the connecting bars 22. The head of each of the bolts 38 has an inclined end face 40 which matches the inner contour of the associated upper profiled bar 7. Nuts 41 are screwed, from the exterior, on to the bolts 38 to complete the detachable connection. This arrangement thus enables the conveyor tray to be rapidly released and replaced.

The connection bars 22 extend substantially over the entire length of the channel section. As shown in FIG. 6, each connectng bar 22 comprises two portions 22a and 22b, the length of each of which is roughly equal to half the length of the channel section, or is slightly less than this. The mutually facing ends of the two portions 22a and 22b are welded to one another. These ends are also welded to the lower profiled bar 5 by way of the projecting ribs 24. At each end of the channel section, each connecting bar 22 has a respective coupling means for connection to complementary coupling means of the adjacent connecting bar (not shown). Each coupling means includes a recess 41 and either a projection 42 or a complementary recess 43. A toggle bolt, or dog-bone connector, (not shown) is insertable into the two recesses 41 of the adjacent connecting bars 22 to secure the connecting bars (and hence the associated channel sections) together in such a manner as to relate tensile forces but to allow the channel sections to be slightly angled relatively to each other in the horizontal and vertical planes. The projection 42 of one connection means engages in the recess 43 in the adjacent connection means to permit this limited articulation to occur.

As shown in FIG. 6, the portions 22a and 22b of the connecting bar 22 are each provided with two superposed rows of slots 44 and 45 which are distributed over the entire length of the channel section. At least one end of each slot 44, 45 is formed as an undercut pocket 46 for accommodating the head of a bolt. Such bolts can be used, in the usual manner, for connecting attachments to the side walls 1 of the channel section. The bolt attachment means correspond to the attachment means of the spill plate holders of known channel sections.

As described above in connection with FIG. 3, the upper floor plate 35 may be a releasable and replaceable wear plate. A preferred arrangement for securing this plate 35 is shown in FIGS. 7 and 8. Thus, adjacent to the two ends of the channel section, and in the vicinity of the two side walls 1, the lower floor plates 36 has a row of apertures 48 into which are welded generally Z-shaped elements 49. On its lower face, and at corresponding points, the upper floor plate 35 carries angled stop elements (claws) 50 which engage in apertures 51 that remain free when the top floor plate 35 is mounted on the lower floor plate 36. By displacement of the plate 35 in the conveying direction, the claws 50 are pushed into position below the Z-shaped elements 49 (see FIG. 8, so that the plate 35 is prevented from lifting away from the plate 36. When conveying takes place in the opposite direction, the upper plate 35 is turned through 180°, and the claws 50 are pushed into a position 52 (see FIG. 8) below different parts of the Z-shaped elements 49, so that the plate 35 cannot be displaced in this changed conveying direction, and is also prevented from lifting away from the lower plate 36.

Figure 9:
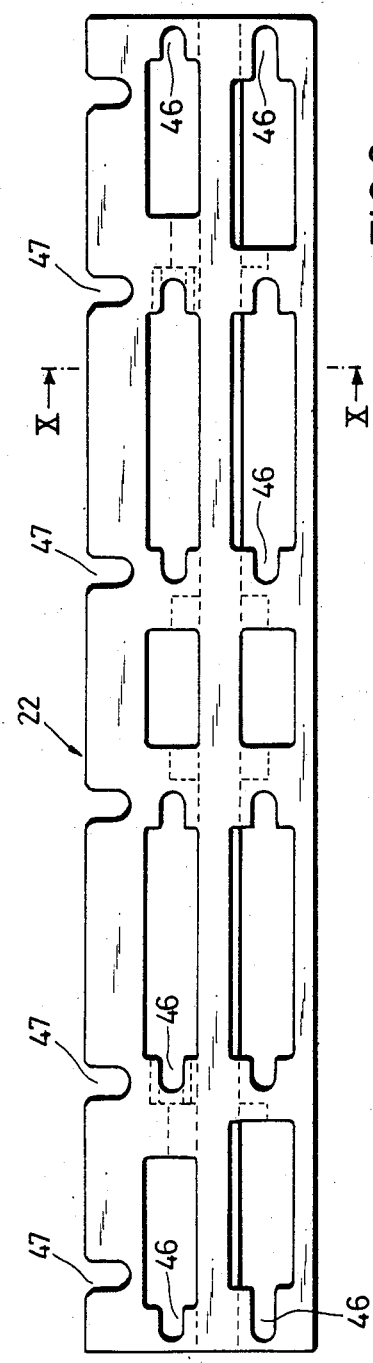
FIG. 9 is a side elevation of a spill plate holder forming part of the channel section shown in FIGS. 5 to 8; and, FIG. 10 is a cross-section taken on the line X—X of FIG. 9.
Figure 10:
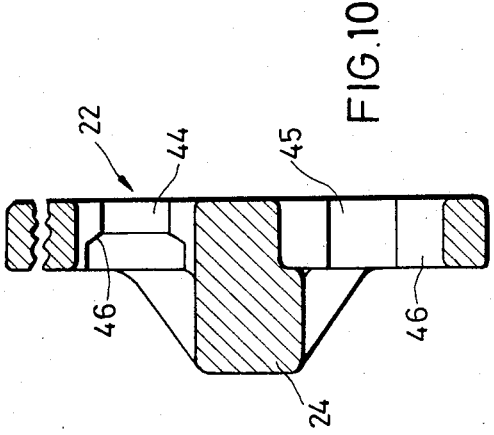

FIGS. 9 and 10 show a preferred form of connecting bar (or spill plate holder) 22'. The connecting bar 22' extends over substantially the entire length of the channel section. Alternatively, the connecting bar 22' may be constituted by two portions (corresponding to the two portions 22a and 22b of the connecting bar 22 of FIG. 6), each of which extends over substantially half the length of the channel section. Varying from the FIG. 6 arrangement, the connecting bar 22' of FIGS. 9 and 10 has a third row of slots 47, which are distributed along its entire length, and are open towards the upper edge of the connecting bar. The open ends of the slots 47 permit the heads of securing bolts (not shown) to be inserted into the slots 47 from above. Thus, attachments can be secured by inserting bolts as required, either into the slots 47 forming the upper row, or into the slots 44 and 45 of the two lower rows. The connecting bar 22' (or its two constituent portions) is also provided with integral ribs 24 which are disposed between the two rows of slots 44 and 45, and which, as described above, engage in the V-shaped grooves formed in the outside of the side wall.

It will be apparent that the channel sections described above have side walls which are formed by two rolled profiled bars 5 and 6 or 5 and 7. This enables a large number of different channel section side walls to be constructed from a small number of basic parts, but in all cases the lower profiled bars 5 and the welded-on connecting bars 22 or 22' can be used unchanged as standard parts. Moreover, the two-part construction of the side walls enables the connecting bars 22 or 22' to be welded, not only at the outer web faces of the profiled bars, but also at the ribs 24. This results in a particularly firm connection between the connecting bars and the side walls, so that forces acting between the conveyor channel sections can be transmitted in a reliable manner to the high-strength connecting bars 22 or 22'.

As previously mentioned, the connecting bars 22 or 22' constitutes spill plate holders. They can, however, also form a guide for a winning machine, particularly a plough, or they can be designed as mounting bars to which the parts of such guide (or other attachments) can be connected.

We claim:

1. A scraper-chain conveyor channel section comprising:
    (a) a base structure including:
        (i) parallel U-shaped lower profiled bars, each lower profiled bar having a laterally inwardly extending lower flange joined to a laterally inwardly extending top flange by an intermediate lower wall segment forming the lower portion of a laterally outwardly facing recess;
        (ii) a floor plate extending between and joined to the top flanges of said lower profiled bars to provide a connection therebetween;
        (iii) longitudinal support bars extending exteriorly over substantially the entire lengths of of said lower profiled bars, with upper portions of said support bars which protrude above the level of said top flanges and with longitudinal ribs on said support bars which protrude laterally inwardly into and extend along the lengths of said recesses; and
        (iv) means for securing said support bars to said lower profiled bars at vertically spaced first and second regions, said ribs being secured along the lengths thereof by welds to said top flanges at said first region, and said second region being located beneath and laterally outwardly with respect to said first region;
    (b) a top structure separable from and supported by said base structure, said top structure including parallel U-shaped upper profiled bars, each upper profiled bar having a laterally inwardly extending bottom flange joined to a laterally inwardly extending upper flange by an intermediate upper wall segment, each upper profiled bar having its bottom flange seated on the top flange of an associated lower profiled bar and having its upper wall segment cooperating with the lower wall segment of the associated lower profiled bar to form the upper portion of the respective laterally outwardly facing recess, said top structure being configured and dimensioned to be received on said base structure between the upper portions of said support bars, with the associated upper and lower profiled bars and support bars comprising the side walls of the channel section; and
    (c) means for removably securing the top structure to said base structure at a third region located above and laterally outwardly with respect to said first region.

2. A channel section according to claim 1, wherein each lower profiled bar has a substantially trapezoidal inner contour which is shaped and sized to guide the scrapers of a chain scraper assembly.

3. A channel section according to claim 2, wherein the lower flange of each lower profiled bar has an inner surface constituted by first and second planar faces, the first planar face being situated adjacent to the free end of the lower flange, and the second planar face being situated adjacent to a vertical web portion forming the base of that U-shaped lower profiled bar, and wherein the first planar face of each bottom flange is inclined at an angle of substantially 9° to the horizontal, and each second planar face is inclined at an angle of substantially 19° to the horizontal.

4. A channel section according to claim 3, wherein each upper profiled bar has an upper flange and a bottom flange, said upper flange comprising the upper flange of the associated side wall, and said bottom flange cooperating with the top flange on which it is seated to form an intermediate flange of the associated side wall.

5. A channel section according to claim 4, wherein the upper flane of each upper profiled bar has an inner surface having first and second planar faces, said first planar face being situated adjacent to the free end of the upper flange, and said second planar face being situated adjacent to a vertical web portion forming the base of that U-shaped upper profiled bar, and wherein said first planar face is substantially horizontal, and said second planar face is inclined at an angle of substantially 35° to the horizontal.

6. A channel section according to claim 1, wherein the upper profiled bar of each side wall is of smaller cross-sectional shape and size than the lower profiled bar of that side wall, each upper profiled bar having a substantially trapezoidal inner contour which is shaped and sized to guide the scrapers of a centre chain scraper assembly.

7. A channel section according to claim 1, wherein the upper profiled bar of each side wall is of similar cross-sectional shape and size to the lower profiled bar of that side wall.

8. A channel section according to claim 1, wherein each connecting bar includes at least two vertically-spaced rows of recesses, the recesses of each row being distributed along the length of the associated connecting bar, and defining attachment points for receiving bolts.

9. A channel section according to claim 1, wherein each support bar comprises at least two portions which are welded to one another at their adjacent ends.

10. A channel section according to claim 1, wherein the upper and lower profiled bars of each side wall define a generally sigma-shaped configuration having a V-shaped recess extending longitudinally along the exterior surface of that side wall.

11. A channel section according to claim 10, wherein each connecting bar includes at least one longitudinal rib formed integrally therewith, said at least one rib of each connecting bar being engageable in the V-shaped recess of the associated side wall and being welded to the associated lower profiled bar in said recess at the level of the top flange of said lower profiled bar.

12. A channel section according to claim 4, wherein the floor plate has a thickness which is substantially equaly to the sum of the thicknesses of the top flange of each of the lower profiled bars and the bottom flange of each of the upper profiled bars, and wherein the floor plate is welded to each of said top flanges and each of said bottom flanges.

13. A channel section according to claim 4, wherein the floor plate comprises a top plate and a bottom plate, the top plate extending between the bottom flanges of the upper profiled bars, and the bottom plate being welded to the top flanges of the lower profiled bars.

14. A channel section according to claim 13, wherein the top plate is welded to the bottom flanges of the upper profiled bars.

15. A channel section according to claim 13, wherein the top plate is a replaceable wear plate detachably connected to the bottom flange of the upper profiled bar.

16. A channel section according to claim 15, wherein the lower surface of the top plate includes stop elements which engage in recesses in respective shaped elements which are secured in apertures formed in the bottom plate.

17. A channel section according to claim 16, wherein each of the stop elements is a claw-shaped member, and wherein each of the shaped elements is Z-shaped and has claw-receiving recesses which open in opposite directions.

18. A channel section according to claim 1, wherein each of the support bars is welded to the associated upper profiled bar.

19. A scraper-chain conveyor channel section comprising:
(a) a base structure having:
  (i) parallel lower side walls, each lower side wall having a laterally inwardly extending first flange joined to an overlying laterally inwardly extending second flange by an inclined intermediate wall segment forming the lower portion of a laterally outwardly facing recess;
  (ii) a lower plate extending between and joined to the second flanges of said lower side walls to provide a connection therebetween;
  (iii) longitudinal reinforcement members extending along substantially the entire lengths of the exterior sides of said lower side walls, said reinforcement members protruding upwardly above the level of said second flanges and having longitudinal ribs which protrude laterally inwardly into and extend along the lengths of said recesses; and
  (iv) means for securing said reinforcement members to said lower side walls at vertically spaced first and second regions, said ribs being secured along the lengths thereof by welds to said second flanges at said first region, and said second region being located beneath and laterally outwardly with respect to said first region;
(b) a top structure separable from and supported by said base structure, said top structure having:
  (i) parallel upper side walls, each upper side wall having a laterally inwardly extending third flange joined to an overlying laterally inwardly extending fourth flange by an inclined intermediate wall segment forming the upper portion of said outwardly facing recess;
  (ii) an upper plate extending between and joined to the third flanges of said upper side walls to provide a connection therebetween,
  said top structure being confined and dimensioned to be supported on said base structure, with said upper plate covering said lower plate and with said upper side walls laterally confined between said reinforcement members; and
(c) means for removably securing said top structure to said base structure.

* * * * *